(12) United States Patent
Kane

(10) Patent No.: US 11,987,947 B2
(45) Date of Patent: May 21, 2024

(54) METHOD AND APPARATUS FOR A FENDER SYSTEM

(71) Applicant: David Kane, Sequim, WA (US)

(72) Inventor: David Kane, Sequim, WA (US)

( * ) Notice: Subject to any disclaimer, the term of this patent is extended or adjusted under 35 U.S.C. 154(b) by 281 days.

(21) Appl. No.: 17/320,734

(22) Filed: May 14, 2021

(65) Prior Publication Data
US 2021/0355645 A1 Nov. 18, 2021

Related U.S. Application Data

(60) Provisional application No. 63/025,041, filed on May 14, 2020.

(51) Int. Cl.
*E02B 3/26* (2006.01)
(52) U.S. Cl.
CPC ..................... *E02B 3/26* (2013.01)
(58) Field of Classification Search
CPC ......................................................... E02B 3/26
See application file for complete search history.

(56) References Cited

U.S. PATENT DOCUMENTS

| | | | | |
|---|---|---|---|---|
| 3,498,251 A * | 3/1970 | Dean | .......................... | E02B 3/26 405/215 |
| 4,804,296 A | 2/1989 | Smath | | |
| 4,841,893 A * | 6/1989 | Ellison | ....................... | E02B 3/26 114/220 |
| 5,911,189 A | 6/1999 | Ryan | | |
| 6,178,909 B1 * | 1/2001 | Palmer | ...................... | E02B 3/26 114/219 |
| 6,196,150 B1 * | 3/2001 | Fondacaro | .............. | B63B 59/02 114/220 |
| 6,332,421 B1 * | 12/2001 | Leonard | .................. | B63B 59/02 114/220 |
| 20,070,068 | 10/2004 | Huizenga | | |
| 7,090,206 B2 * | 8/2006 | Chase | ..................... | F16F 9/003 267/139 |
| 7,448,338 B2 | 11/2008 | Stewart et al. | | |
| 8,225,734 B2 | 7/2012 | Huizenga | | |
| 9,038,556 B2 * | 5/2015 | Ulgen | ..................... | B63B 59/02 114/220 |
| 10,294,048 B2 * | 5/2019 | Smith | .................. | B65G 69/001 |
| 2021/0355645 A1 * | 11/2021 | Kane | ......................... | E02B 3/26 |
| 2021/0355646 A1 * | 11/2021 | Kane | ......................... | E02B 3/28 |

* cited by examiner

*Primary Examiner* — S. Joseph Morano
*Assistant Examiner* — Jovon E Hayes
(74) *Attorney, Agent, or Firm* — Prorok Patents

(57) ABSTRACT

In general, embodiments of this invention relate to methods, apparatuses, and systems for providing boat or ship protection from damages associated with vessel contact, allision, or other physical contact or with objects. Therefore, the preferred embodiment of the invention is represented by a Fender apparatus Comprising: A first and second crossbar; and At least one fender rotationally connected to the first crossbar at one end of the fender and rotationally connected to the second crossbar opposite the first crossbar, wherein there are three fenders rotationally connected to the first and second crossbars.

19 Claims, 9 Drawing Sheets

METHOD AND APPARATUS FOR A FENDER SYSTEM

CROSS-REFERENCE TO RELATED APPLICATIONS

My U.S. Provisional Patent Application No. 63/025,041, filed 14 May 2020, is incorporated herein by reference, and priority to that applications is claimed.

REFERENCE TO A "MICROFICHE APPENDIX"

Not Applicable

BACKGROUND OF THE INVENTION

The field of the invention generally relates to the field of boating and, more specifically, to the field of boat protection. In this nonprovisional, reference to a boat includes all types of watercraft, water going vehicles, or vessels, including yachts, superyachts, dinghies, cargo ships, speed boats, fishing boats, ferries, wake boats, amphibious vehicles, and trawlers.

In general, embodiments of this invention relate to methods, apparatuses, and systems for providing boat or ship or object protection from damages associated with vessel contact, allision, or other physical contact or with objects.

BRIEF SUMMARY OF THE INVENTION

The purpose of this invention is to provide a fast, easy, cheap, versatile, and portable method of protection between a boat and a dock. In shipping and boating, there are many varieties of vehicles and docks. For this nonprovisional, a dock may be anything physical that a boat is tied to. Boats may also be tied to other boats, which will be treated here as a boat and dock. Boats can be tied to multiple docks or even beached-which is here considered a form of docking. The claimed invention allows for a boat to be docked while providing buffer protection to prevent cosmetic or structural damage to the hull and significantly reduce wear over time on the boat as well as reduce the noise. The preferred embodiment of the invention allows for a minimal gap between the boat and the dock. Therefore, to fit any boat and any dock with any point of contact, the invention comprises a crossbar, at least one fender rotationally connected to the crossbar, and at least one eyelet operationally connected to the crossbar or fender that is capable of receiving a fender whip or other rope from which the fender system connects to the dock or boat or both. In an alternate embodiment of the invention, the fender system can be affixed to the dock or boat by other more permanent means. The present invention can scale to take any fender type or style in any size. The invention hangs or is otherwise attached from either the dock or the boat and may even be arranged to sit so that fifty percent, or any other percentage of a fender, rests higher than the dock or rail to facilitate protection during boat best to dock contact as the need arises. The invention in such positions may also be off-center from the cleat or other tie-down device—the invention enables its own placement in many positions.

The present invention reduces physical damages associated with a boat docking and being docked as well as other consequences of physical contact with a dock such as noise generation. The present invention helps reduce the probability of boat hull puncture or other loss of integrity in the boat structure-including damages from wear over time such as loss of paint, gel coat, or other surface materials of the boat. The present invention is capable of protecting a boat at many unique angles and positions so as to be useful regardless of what form of boat and what form of a dock are tied together (how the boat and dock are tied may affect where the points of contact between the two are located). The present invention presents a dynamic form of protection, enabling protection even when the boat and/or the dock are not static but moving, such as when then they are moved by tides, wind, or waves. The present invention is extremely cost-effective and, by being dynamic, reduces wear and damage it might otherwise receive itself. This inventions also increases the speed of fender placement as it places rows of fenders at one time The present invention can overcome the unique angles presented by rub or rail lines or other guards on boats. The present invention, in some cases, also reduces the tools or effort needed to access the boat by allowing the boat and the dock to remain relatively close together. In some cases, the present invention can serve as a tool itself to help facilitate access to the boat by providing a place for a person to step from a boat to a dock. The present invention can provide the option to beach the boat on land by providing dynamic protection to the underside of the hull, for instance. By being cost-effective, light, and portable, the present invention allows for it to be practical in remote areas, lightly manned boats, and where space is an important factor.

Given the tough, durable, and lightweight protection that the system offers and the fact that as a roller, it can operate as a low-impact wheel system that is extremely suitable for rough terrain or sensitive terrain. The embodiments of this invention are not limited to protecting boats but may be used as rollers for a variety of tasks, including load moving. This is because the weight of a load can be distributed across the length of the fender when it is used as a roller in this system. Doing this lowers the pound per inch pressure that the fender applies to the ground, which is useful to support loads over soft or sensitive terrain that limit the pressure per inch that can be applied, such as, not limited to, drainage fields or those filled with relatively fragile pipes. Given the soft but durable nature of a fender, there is an ability to provide load movement protection on steep slopes as when a stokes basket is pulled up or down a steep slope or vertical cliff face-mitigating rough objects like rocky crags and outcroppings.

DETAILED DESCRIPTION OF THE INVENTION

Figure 1:
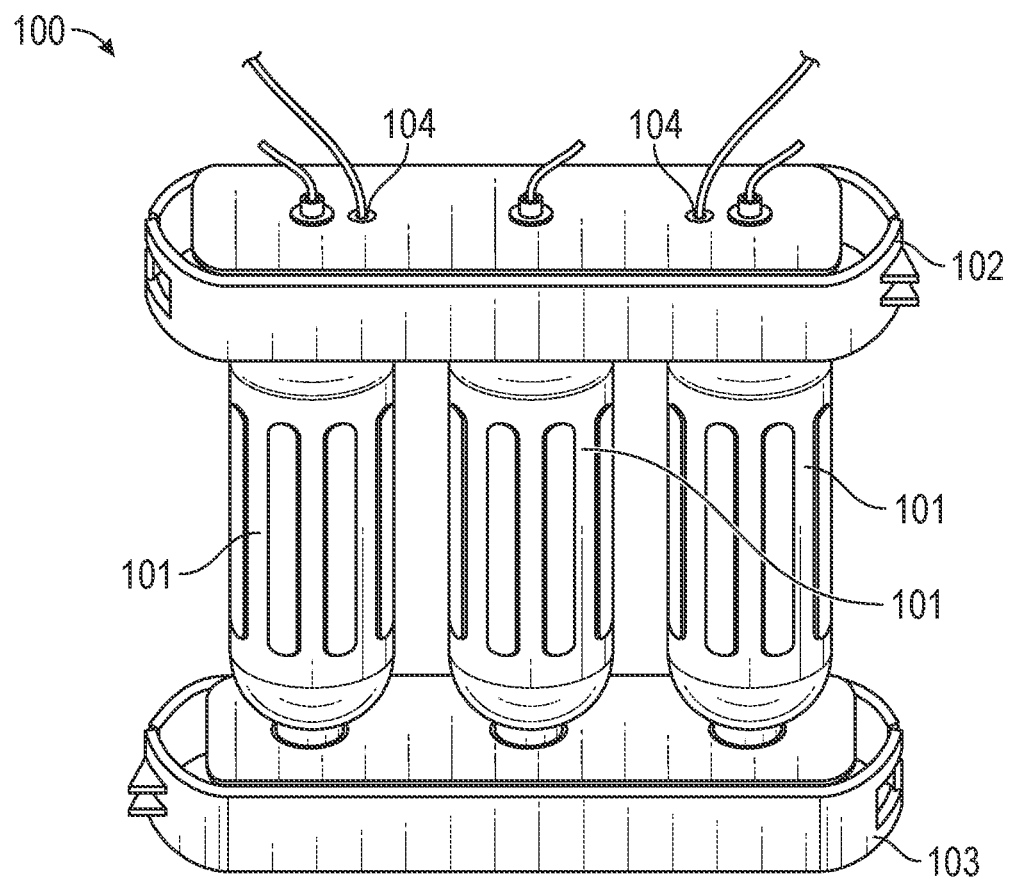
FIG. 1 depicts a perspective view of a preferred embodiment of the fender apparatus.

FIG. 1 shows a preferred embodiment of the invention. The fender system 100 shown is comprised of at least two cylindrical fenders 101 rotationally attached to a first crossbar 102 so that the fenders 101 are below the first crossbar 102 forming a fender row. A fender row is defined in this application to be at least one fender, but if more than fender then a fender row is to be a true row and a true row occurs when fenders placed in a line. Therefore, the first crossbar 102 holds the fenders 101 in a row. There is a second crossbar 103 added, which operationally connects to the fenders 101 on the opposite side of the fenders 101 from the first crossbar 102. The top crossbar 102 have at least one eyelet 104 capable of receiving rope (e.g., a fender whip) and is able to support the weight of the fender system when operationally connected to a rope. The bottom crossbar 103 may also have an eyelet. The configuration of the fender system 100 shows the fenders 101 spaced evenly along the first crossbar 102 and second crossbar 103 in a manner allowing them to freely rotate along a y-axis running the length of the fenders 101 (e.g., roll by rotating around a center lengthwise axis). The second crossbar 103 rotationally connects to the fenders 101 opposite the first crossbar 102 and has at least one eyelet 104. The second crossbar 103 helps to secure the fenders securely in a row which makes the system more reliable and simpler to use. The system allows for the boat and the dock to roll along each other instead of dragging.

The crossbars 102 and 103 may be interchangeable so that either crossbar may serve as a top or bottom crossbar when hung from a boat. Depending on the embodiment of the invention, the crossbars can rotationally connect to different styles of fender. In some cases, fenders styles cannot easily accommodate a bottom crossbar in the same style of crossbar as the top crossbar would be, such as with ball fenders, these fenders can do without the bottom crossbar or have a custom bottom crossbar fitted for them.

The fender bar will operationally and rotationally connect according to the style of the fender. For instance, cylindrical fenders having a center-hole running the length of the fender, so in that case, the fender may connect by a rope running through that center-hole and a stopper mechanism on the rope. The crossbars can be manufactured to be able to accommodate any number of fenders or size of fenders or shape of fenders or combination. In a preferred embodiment of the invention, the crossbars will be of foam or other buffer material suitable to use in marine environments. In one such embodiment of the invention, the crossbar is made of U.V.-resistant marine grade foam with a semi-rigid core of plastic, metal, or ceramic material. At different sizes or for high stress uses, the crossbars will incorporate any material necessary to meet the demands of those stressors. The crossbar portions in most embodiments are not intended to stick out past the edge of the attached fenders but are instead intended to have a smaller diameter than the fenders to, for instance, reduce chances of contact with vessel or dock. However, in some embodiments, the crossbar may extend beyond at least one side of the fenders. Crossbars may be any material and may fold be crooked or attach to other crossbars to increase the number of fenders used. The crossbar may be firm enough to be used as a step when placed appropriately. In some embodiments, the fenders do not need to pivot and thus exist without the ability to pivot fenders.

In a preferred embodiment, the crossbars will include at least one eyelet to allow a rope to be tied to the crossbars in any manner to ensure that the crossbars will support the fenders they hold. In a preferred embodiment of the invention, each crossbar will have at least three eyelets or cleats to allow for a variety of ties. This is one eyelet on each end of the crossbar and one eyelet in the middle of the bar. The eyelets may be on the sides or on the top of the crossbar. All fender styles can rotationally connect to the crossbar, preferably by an easy clip- or tie-on method. In at least one embodiment of the invention, the fenders are flat, thus taking up even less space between the boat and the dock. These flat fenders are harder to rotate but may still be rotationally connected to the crossbar, or they may be static. In some embodiments of the invention, the top crossbar can be used as a step by itself or with the fenders attached. Further, the combination fender apparatus 100 can be hung in front of the boat so that it fits the form of the boat and directly sits on and protects the bow from damage.

In this preferred embodiment, the crossbars do not entirely limit movement of the fenders 101 to a rolling motion but also allow the fenders to pivot so that the fenders 101 need not be limited to rotational movement along a lengthwise axis. The crossbars 102 and 103 can accommodate slight movement in the angle of the fender 101. In at least one exemplary embodiment the fenders have at least two degrees of rotational freedom where they connect to the crossbar and in a least one exemplary embodiment the fenders have three degrees of freedom. This allows the fenders 101 to pivot together. So, as the fenders 101 are rolled along the boat or dock by forces, including environmental or vessel momentum forces between the boat and dock, they can pivot to ensure that they can roll alongside the boat in rougher conditions and are not whipped out of place. Such angling helps the fenders continue to roll (rotate along the fender's y-axis) when the fenders have been dragged slightly out of place due to boat movement. The rotation and the pivot of the fenders help to ensure that the fenders do not move out of place, which is defined as a place where the fenders of the invention do not provide protection to the boat.

Figure 2:
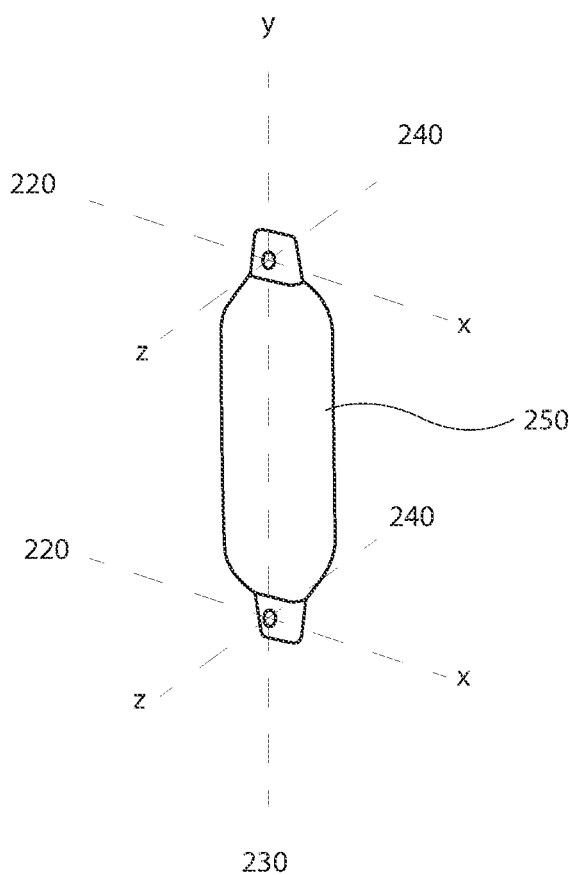
FIG. 2 depicts a perspective view of a fender and the axis of rotation available when the fender is rotationally connected with three degrees of rotational freedom to a first crossbar and a second crossbar.

FIG. 2 shows the axis of rotation of a fender system with three degrees of rotational freedom. Here the x-axis 220, y-axis 230, and z-axis 240 all converge on the point of the fender 250 where the crossbar would connect to the fender.

Figure 3A:
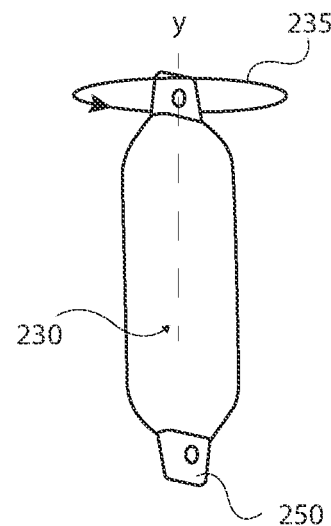
FIGS. 3a-3c each highlight the rotational direction of a fender along one of the three axis when the fender is connected to a single crossbar (although these axis do not change when connected to a first crossbar).
Figure 3B:
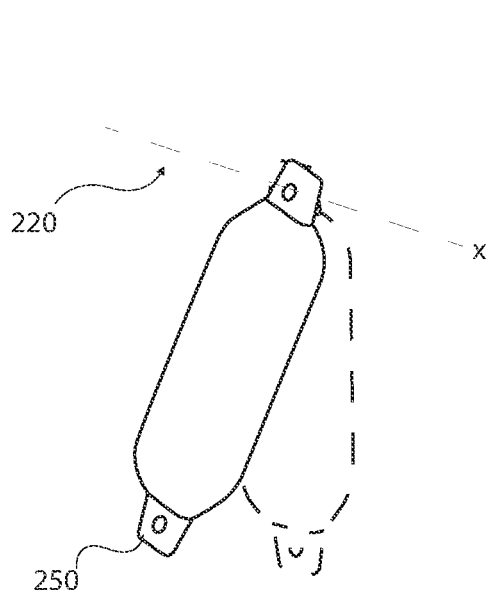
Figure 3C:
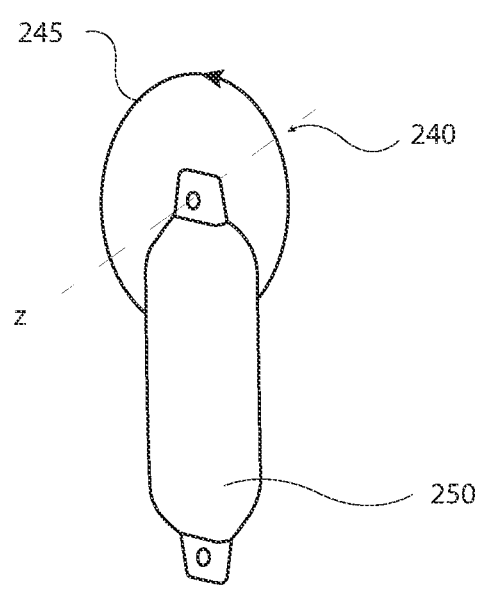

FIGS. 3a, 3b and 3c show the respective axis for an individual fender 250. FIG. 3a shows the rotation direction 235 around the y-axis 230, FIG. 3b shows the rotation around the x-axis 220 of the fender 250, and FIG. 3c shows the rotation direction 245 of the fender 250 around the z-axis 240. In at least one exemplary embodiment, a fender having at least two degrees of rotational freedom when rotationally connected to the crossbar may not rotate around multiple axis at the same time.

Figure 4:
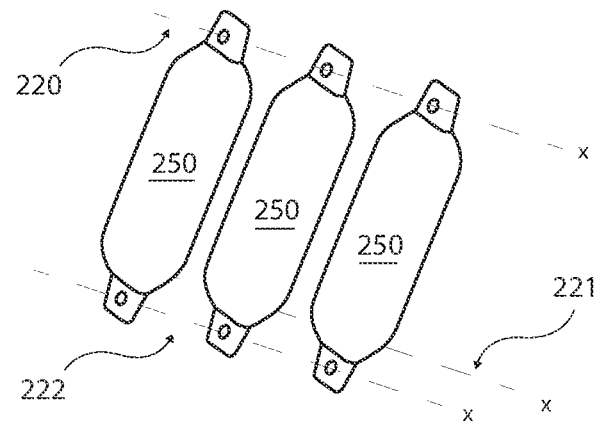
FIG. 4 depicts a rotation of a row of fenders around the x-axis as if connected by a crossbar.

FIG. 4 shows rotation along the x-axis 220 for the fenders 250 when in a row. This rotation has moved the x-axis 222 for the lower portion of the fenders from its original position at 221. In at least one exemplary embodiment when fenders 250 are in a row and connected to a first and second crossbar and rotated in this manner, both crossbars may rotate to adjust.

Boat movement can cause a single fender whip to rotate the fender system as a whole, so the fender system is horizontal. For example, a fender whip with a 6-foot length would allow for the fender to swing in a circle with a 6-foot radius. Realistically only the bottom half of the circle would be realized, but during the endpoints of the arc, the fender would be horizontal and unable to roll. This path is followed sometimes as a boat drags along a dock causing the fender to swing into a horizontal position. However, the use of at least two fender whips attached in two different points to the boat or the dock limits this movement (as does the angling, rotation, and row length of the fenders) by changing the potential for fender arc. The use of two fender whips, where each whip is attached to at least one of the crossbars, can limit the potential of the fender to be dragged into a horizontal position. In some cases, a single fender whip may be able to create the same effect if the whip is attached through or at both ends of a crossbar. So, by increasing row size, allowing rotation of the fenders, allowing at least some fender pivot, as well as by better fender whip attachment, the chance of the fender system turning horizontal or coming out from between dock and boat is essentially nullified. Each step, rotation, increase in row size, pivot ability, and fender whip attachment, each on their own, significantly reduce fender whip, which allows better ways to secure to dock or boat, and some alternate embodiments utilize only one or more of each step.

Figure 5:
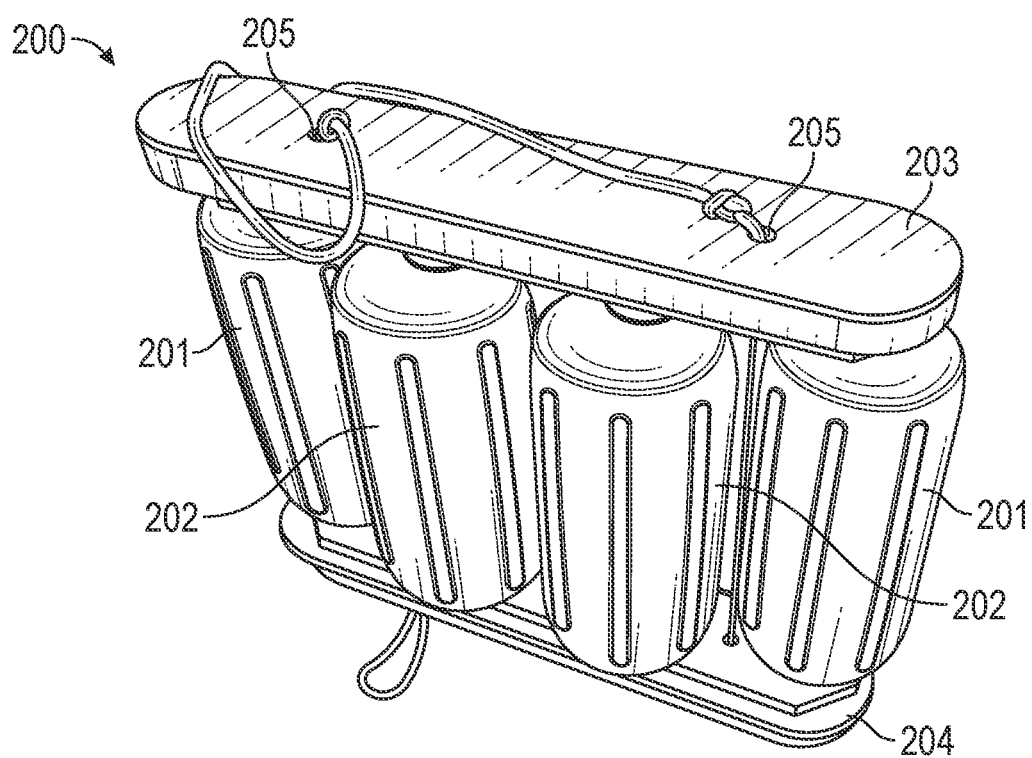
FIG. 5 depicts a perspective view of a preferred embodiment of the invention where fenders are in a row, but several fenders are offset in the row.

FIG. 5 shows a preferred embodiment of the invention where the first row of fenders 201 operationally connected to a top crossbar 203 and a bottom crossbar 204. Fender row 201 contains a fender row with subset fender row 202 offset from the first subset row of fenders. This fender system 200 allows for a dock to make contact with one set of fenders, whereas the boat will make contact with another set of fenders. This reduces friction stresses from rotation on the boat and the dock as the offset fenders against the dock spin into the air and the offset fenders placed against the boat spin into the air. Here the crossbar 203 and the crossbar 204 need to be strong enough to withstand and transfer the forces from the boat pushing into the dock from the boat to the dock and vice versa. In some cases, such as when a boat enters a dock, the fenders touching the boat will not roll but be static, even staying in place on the boat, even though the fenders touching the dock will roll as the boat moves into place—this further reduces friction and wear on the boat. This fender system 200 works well in surges that might move boats and docks differently as the rate of roll can be different for the fenders touching the docks and the fenders touching the boats (it is important to remember that a boat is tied to is considered a dock in this document). The fender system 200 has eyelets 205 for a fender whip.

Figure 6:
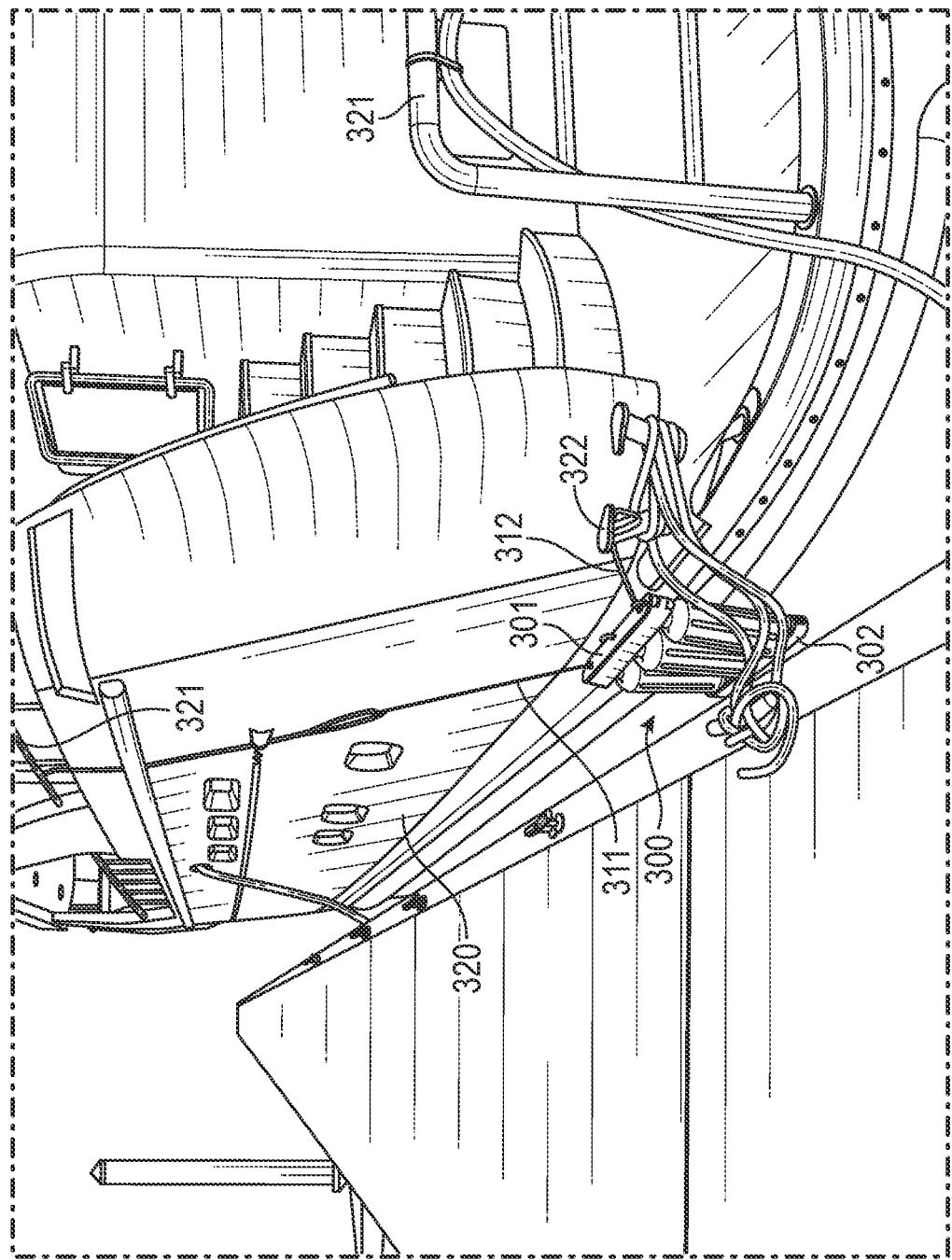
FIG. 6 depicts a perspective view of a preferred embodiment of the invention hung from two fender whips to best protect the boat.

FIG. 6 shows a preferred embodiment of the invention. This fender system 300 has two fender whips 310 that connect to the boat 320 in different areas. Here fender whip 311 connects to the boat on the handrail 321, and the fender whip 312 connects to cleat 322. Fender whip 311 connects to crossbar 301. Fender whip 312 connects to crossbar 301 but in some configurations may connect to the bottom crossbar 302. However, being able to be tied in this manner or the manner shown, fender system 300 can remain securely in place, provide a step onto the boat, and negate the need for a thicker fender by suppling multiple smaller fenders to a single area.

Figure 7:
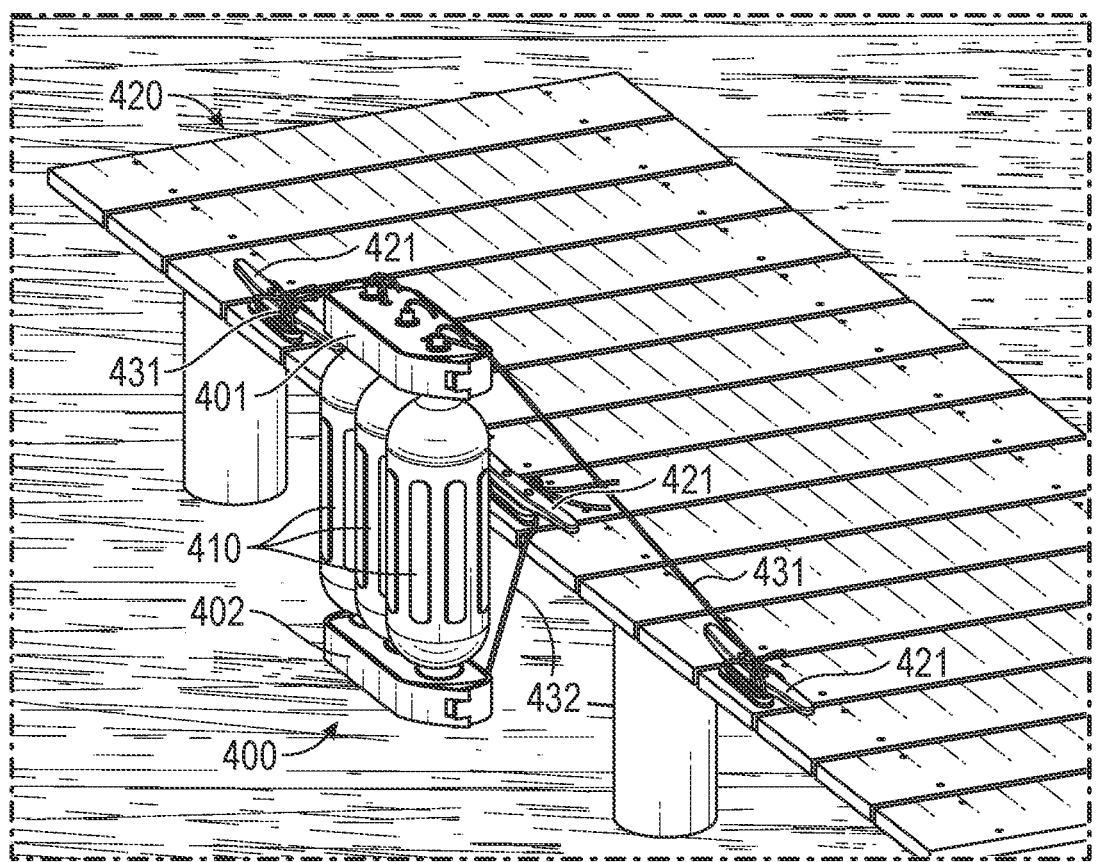
FIG. 7 depicts a perspective view of a preferred embodiment of the invention tied to sit partially above a cleat.

FIG. 7 shows another ability of the present invention. This is the ability to be tied so that part of the fender system 400 remains above tie down cleats, such as cleats 421. Using a fender whip connected to an eyelet 440 on the second (e.g. [[ ]]) lower crossbar) allows the fender to protect areas of high contact that are at risk, especially when a small boat is tied to a large boat, the boat has a portion of itself extending over the dock, or generally, the boat tends to be slightly larger than or misfit to the dock 430. For example, when a small boat such as a dingy that fits under the curve of a large boat-like yacht, the curve of the yacht requires unique fender placement to protect the small craft.

There are several ways to achieve this effect of positioning the fender system 400 above cleat 421 level. A bottom crossbar 402 is used in conjunction with the upper crossbar 401 to tie the system 400 to a cleat 421 and support all the weight of the system 400. This is achieved by tying a fender whip 432 to the bottom crossbar 402 and a fender whip 431 connected to the top crossbar 401. The fender whip 431 is able to keep the fender system 400 close to the cleat 421. By being tied to the bottom crossbar 401, the fender whip 432 can hold the fender system 400 above the cleat 421, and by being tied to the top crossbar 402, the fender whip 431 can hold the fender system 400 in place (so that the top crossbar 402 does not fall and rotate down causing the bottom crossbar 401 to become the top crossbar and the system to hang instead of sit). This means the fender system unit will sit correctly on dock 420 because it is supported from the bottom crossbar 402 and tied to the cleats 421 on dock 430. The lack of hanging also has the benefit of ensuring the fender system 400 doesn't sit in the water and get dirty from marine oils in the water or attract marine growth as fenders. Especially as fenders laid horizontally on the waterline tend to do. The fender system can be tied in this sitting manner to only one cleat if the cleat is able to receive both fenders' whips.

Another way to achieve the hanging effect is by using more than one top fender whip. First, the fender system is tied using the available fender whip eyelets on the bottom bar resulting in the bottom crossbar acting as the main supporting crossbar, which is then tied to a first cleat. Then two fender whips are attached to the top crossbar and tied down to the dock, with one fender whip tied to the same cleat as the fender whip attached to the bottom and the other fender whip attached to a new cleat for further stabilization and support. The effect is the same: namely that the fender system is deployed above the dock line. Any combination of fender whips and cleats that fit the fender system 400 may be used. Therefore, among other things, this system 400 offers a variety of fender whip attachment points that increase the ability of the fender unit to be secured as conditions merit. This system has strong fending capabilities by grouping fenders and combining them in a crossbar that can handle a variety of fender whip tie-downs in a manner that increases attachment positioning, attitude, and protection.

This opens another area of the boat to protection as this system can be hung over the forward end of the bow of a boat and protect it effectively from a dock in such a manner as to match the inward curve from bow edge down to the waterline, which narrows to the keel (e.g., past vertical). This is achieved by the use of multiple fender whips wherein the fender system 400 is tied so that the fenders 410 are laid horizontal across the bow, and the fenders whips pull the lower fenders inwards towards the boat-overcoming boat flare. This past vertical hanging can be done on a non-horizontally hung fender system 400 as well as anywhere along with the boat.

Figure 8:
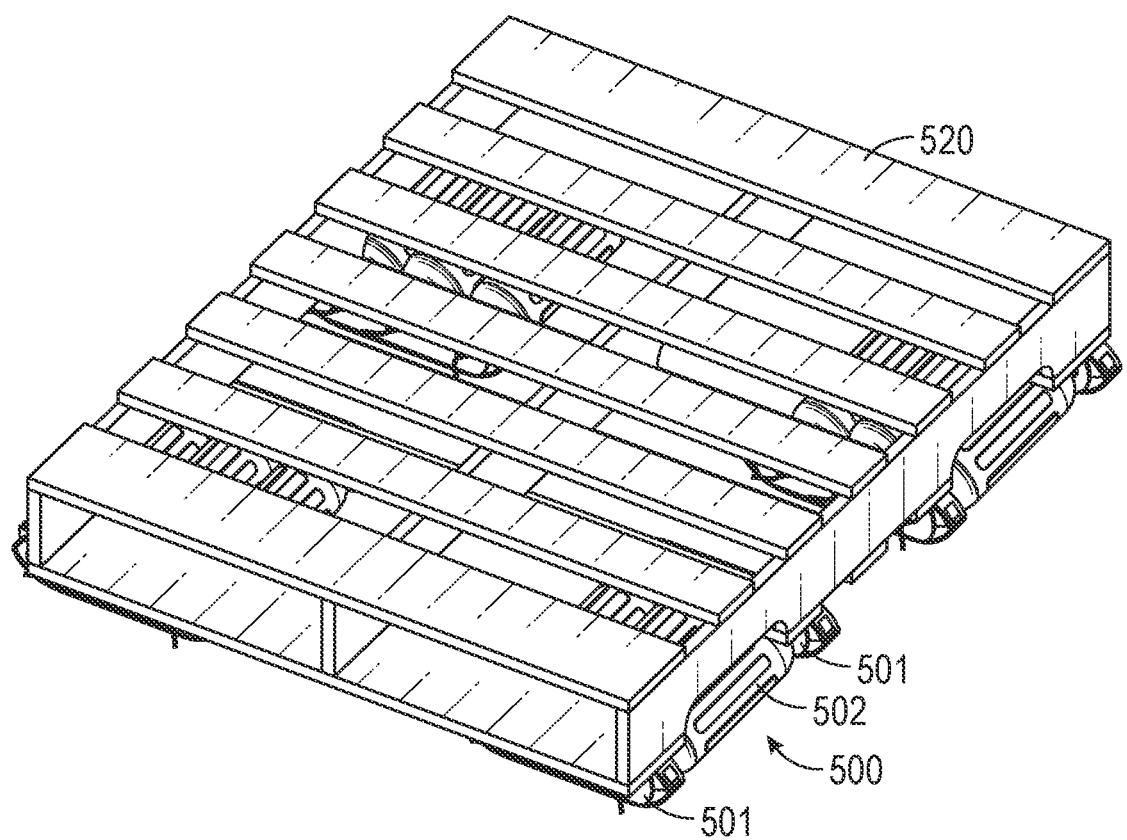
FIG. 8 depicts a perspective view of a preferred embodiment of the invention operationally attached to a wooden pallet.

FIG. 8 shows an embodiment of the present invention, where multiple systems of the embodiment are used as a portable roller device placed underneath a load carrier (as shown here: a wooden pallet 520) to enable that wooden pallet 520 to be rolled along a surface. The crossbars 501 here extend over one edge of the fenders 502 allowing the system 500 to connect to wooden pallet 520 so that the fenders 502 can rotate. The load-bearing capabilities of the fenders system 500 are not limited to wooden pallets. A preferred embodiment of the present invention may be used as a portable roller to be placed underneath an object such as a boat or other heavy piece of equipment during beaching or unloading or at other times when the bottom of the object may otherwise scrape against the ground or a solid surface. Multiple embodiments may be used at once to ensure that the boat or other object can move some distance on a beach. The embodiment of the invention may be used anywhere, including on the boat itself, or in the mountains or desert, even to help transport gear (including, for instance, large, heavy pieces like a spinnaker pole or mainsail boom or trail building supplies.) The fender system 500 can be used in conjunction with a second fender system of the same 500 to allow the beached vessel to continue for a distance with the repeated rotation of fender units under the front end, over and over. This system 500 can be used for occasional heavy parts or gear positioning such as batteries or an engine removal during repower and lifting sailboat booms or poles, etc., which may be too heavy to lift. This system 500 can enable downhill mountain recreational carts—the fenders can take rough terrain.

This is also useful when dealing with a medical basket as with the use of at least one fender system 500; the system can take rocky and craggy surfaces and be pulled up without having rescue personnel needing to rappel down and carry the patient up the hill or cliff as the patient is already protected from bumps on the way up. By using the fender system of the present invention, the fender system gains another capability by providing low cost and easy protection to load carrying on delicate terrain.

The weight distribution through the fender system is high, meaning a very low pound per square inch is presented to the terrain. Due to high load distribution, the fender system could be adapted to many loads, even on land, such as a heavy load of supplies like wood beams. Since this system is more open than a cart, it enables the transport of irregular shapes, such as a load of 2×4s or a hot tub, both different but bulky shapes. Sensitive terrains include drainage fields or septic systems that are not amiable to small hard wheels or large, heavy tracks. The fender system 500 can also be used when in an offset fender combination, as shown in FIG. 2.

As fender system 500 is comprised of fenders in a row connected by at least one crossbar, it is enabled to take on thinner fenders as they work together instead of separately. This low cost, ease of use, adaptability, and portability open the fender system 500 up to even new uses cases such as operating as normal fenders but then operating in a new manner as load-bearing transport over a solid surface, such as when small sailboats are pulled up onto docks. The fender system 500 could protect the sailboat hull from the dock even as it is pulled up and placed on the dock. Because the fender system 500 is a self-contained row of fenders, it is easy for a small crew to handle and thus also optimum for use with remotely operated vessels or unmanned vessels that may only have a small receiving crew. The Fender system 500 is also useful when a boat crew is suddenly trapped by bad weather and only has existing supplies to beach with. The small and lightweight also make this an effective solution for smaller vessels such as rigid inflatable type craft.

Figure 9:
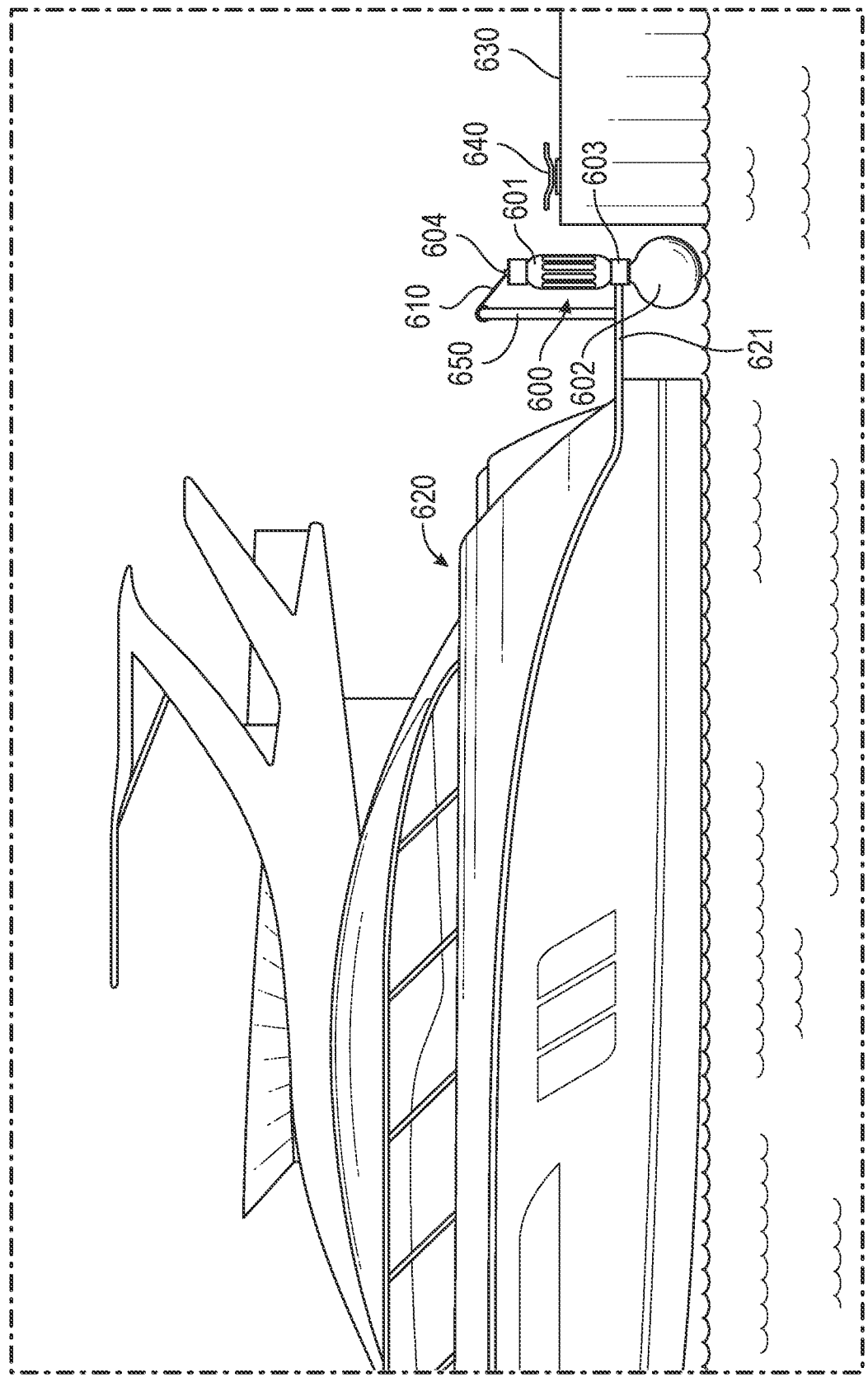

There are several possible embodiments with multiple layers of fenders. FIG. 9 shows a preferred embodiment of a multiple-layer fender system 600. In this shown embodiment, there is a first layer of fenders 601 and a second layer of fenders 602 with a crossbar 603 serving as a middle layer and a second crossbar serving as a top layer. The top crossbar 604 has at least one eyelet, and if multiple eyelets, with one of the eyelets at each end. (Fender whips 610 attach to the crossbar 604 via the eyelets. If the eyelets are located on the middle layer crossbar the fender system can be tied at or near the level of the cleat or railing the system is tied to.) The first row of fenders 601 sits to just rise above the swim step edge 621 of the boat 620. The first row of fenders 601 is offset from the crossbar 603 (this offset can be static or dynamic if swivel joints are used). The offset allows for the second row of fenders 602 to be larger than the first row of fenders 601 and hang down from the crossbar 603. The larger fenders of row 602 enable the fender system 600 to fill the space between the hull and dock 630, which is a larger gap than the hole between the boat deck edge 621 and the dock 630. This prevents damage from the boat rotating in the waves. In the situation presented in the figure the fenders system 600 can hang from a railing 650 or the dock cleat 640.

In some embodiments, the first layer of fenders 601 need not be offset, or the other layers may be offset instead of or with the first layer of fender 601. The fenders of the first row 601 and the second row 602 may be a combination of different fender styles. One such example would be cylindrical fenders on the first layer and ball fenders on the second layer. These ball-type fenders will hang from the crossbar 603. The crossbar 603 may include an armature post to hold a fender vertically in a position that will offset the lower fender 602 so that, the lower level of fenders will sit under the spray rail, rub rail, gunnel, or other overhang or 1-shape of the boat while the first level will protect the gunnel or spray rail which sticks out. This may help better match the fender to the boat regardless of where along the boat the fender is placed, especially if the boat is curved. For example, this would fit the invention to the shape of the boat, which is tapered at the waterline due to the presence of a guard or natural curvature of the boat hull. Like the fender system 600 with one smaller fender and one larger fender, this may be best used in cases where the waves cause the boat to rotate along the axis of boat length so that the lower portions of a hull will turn up and come closer to the dock (e.g., the boat rocks). The middle crossbar portion 603 may serve as a fender. However, the invention may also be tied so that the crossbar sits just under an edge, allowing the fender to protect said edge.

In an alternate embodiment of the invention, there may be a top crossbar and a bottom crossbar, as well as a middle crossbar. Thus, there would be at the top of the fender system a crossbar, below that fenders, below those fenders another crossbar, and below the second crossbar, another layer of fenders with a respective crossbar below that. These fender layers need not be composed of different style fenders as protection for a large vertical area may be enough or achieved in this way. This crossbar fender alternation may repeat as often or as few times as desired to meet specific needs or a general desire and may stop on a crossbar or fender layer.

In an alternate embodiment of the invention, a multi-level fender system can have a first fender row, a crossbar, and a second fender row where the crossbar supports a large horizontal fender and contains an offset upper fender system. This offset fender system may consist of an offset armature post capable of receiving a cylindrical center-hole fender. The offset of the armature may be adjustable by hand crank or may freely swivel-its motion controlled by the motion of the boat and the dock. The fender system of the present invention can accommodate a variety of fender styles, with the main consideration being to best fit the shape of the boat. This is as depending on the type of boat; it may be best to use a variety of fender arrangements or even to add another layer of fenders to the system due to the shape of a boat. For example, a multi-layer embodiment of the invention is excellent for protecting the vessel transom and stern rails—as well as the low swim step itself.

Figure 10:
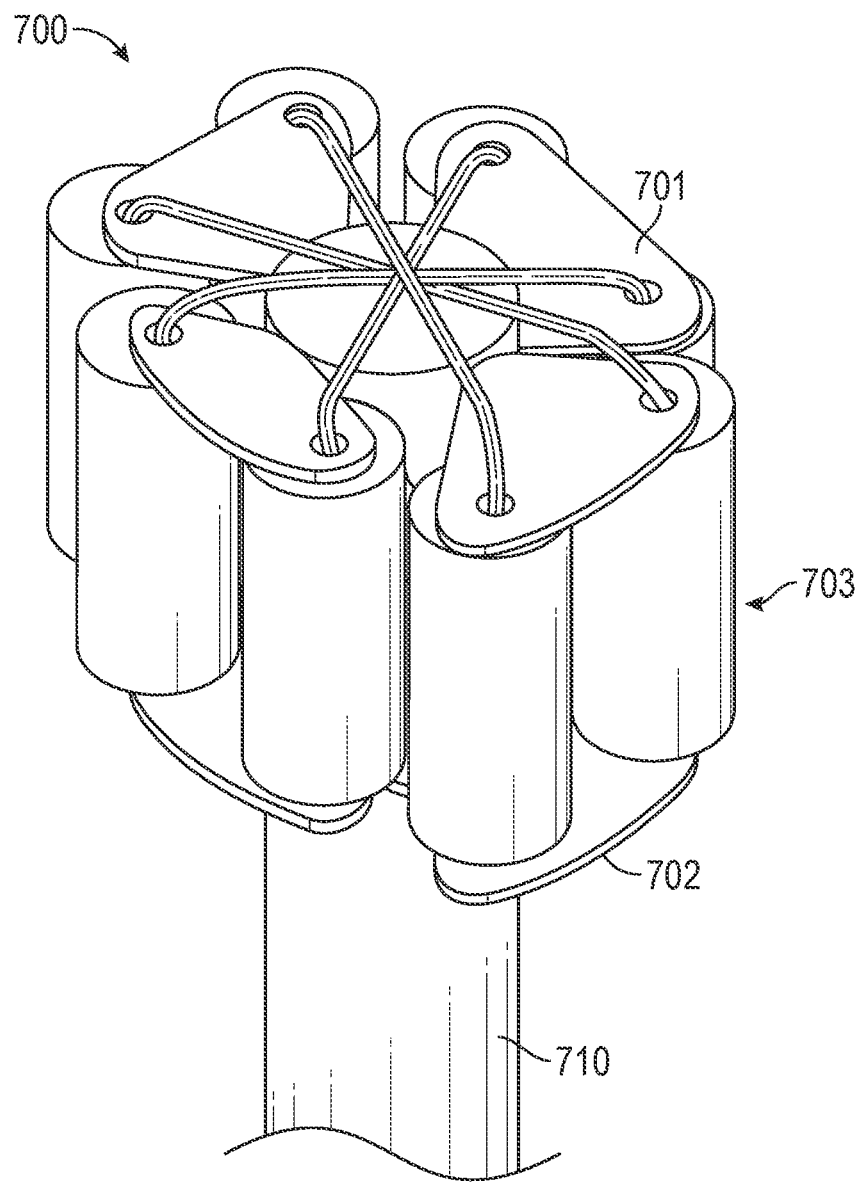
FIG. 10 depicts a perspective view of a preferred embodiment of the present invention able to fit a dock post.

FIG. 10 shows an embodiment of the present invention wherein the top crossbar 701 and the bottom crossbar 702 are wrapped around a pillar 710 so that the rotating fenders 703 are placed around the pillar 710—this allows a boat to glide past the pillar. In one embodiment the pillar 710 and fenders 703 do not touch. In another embodiment of the present invention, the crossbars 701 and 702 themselves rotate around pillar 710. Pillar 710 may be substituted for some other object, such as a cylindrical corner post. The fit to a cylindrical object such as a piling or post is achieved by taking the straight crossbar and allowing it to pivot at certain distances along its length so that it can bend around the pole. In some embodiments in the inside edge, in-between each pivot point, the edge is recessed to allow the crossbar portion to better fit the curvature of the piling. The fenders 703 may hang down as normal between two modified crossbars, or they may be hung at an angle to ensure that more of the circumference of the piling has protection. The fender system 700 can hang via net, rope, bungee, or other reasonable methods to the top of the piling. However, the fender system 700 can also hang from the boat but still be placed around the piling as well (This is beneficial if the top of the piling cannot be reached) or hung or placed almost anywhere else. The embodiment of the invention can raise or lower with the tides, but the invention can also be of limited travel, depending on the method used to secure it to a dock and/or the addition of rollers to the inside edge portion of the crossbar (which ease vertical travel). The object need not be cylindrical but may be any shape, and the crossbar may be customized to fit the shape while holding the necessary fenders in place.

Figure 11:
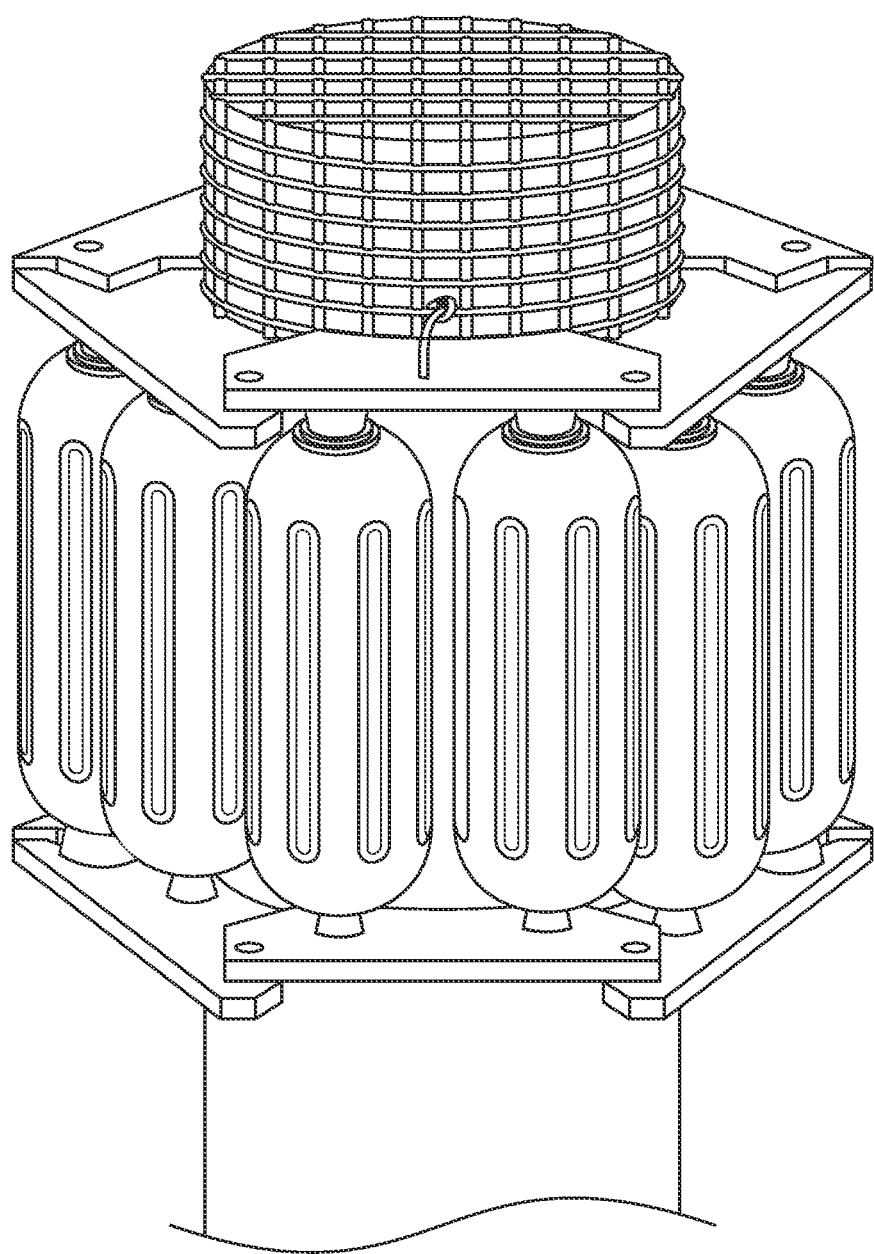
FIG. 11 depicts a perspective view of a preferred embodiment of the present invention with a hinged crossbar able to fit a dock post.

FIG. 11 shows a fender system 1200 hanging from a net 1211 via a clip 1212 connected to an eyelet on the crossbar 1220. The net 1210 holds the fender apparatus over a piling 1210. The crossbar 1220 and the crossbar 1221 are multi-level hinged crossbars with hinges 1225.

In general, of the present invention of this application: The crossbar portion can be made to scale with fender size. Fenders may be designed solely to better fit this system. The invention can be freely and temporarily hung from a boat or dock or permanently attached to the one or the other. Adding at least one additional fender whip increases the load bear capability of the fender system allowing it to serve as a step. Further, the fender system may be raised partially above dock level and off-center from a cleat. The drawings and figures show multiple embodiments and are intended to be descriptive of particular embodiments but not limited with regards to the scope or number, or style of the embodiments of the invention. All portions of the present invention may be sized to incorporate branding. Although directional terminology is used, the invention may be operated upside down, perpendicular, or at any other angle to the directions mentioned. The boat and dock combo has been picked to help with visualization of the invention and to show the best mode of the invention. However, more generally, the present invention can protect a first object from a second object. A cleat can in any case, unless explicitly said otherwise, be read as any other suitable tie-down area for a fender whip.

Of this application, nothing should be construed as critical or essential unless explicitly described as such. Also, the articles "a" and "an" may be understood as "one or more." Where only one item is intended, the term "one" or other very similar language is used. Also, the terms "has," "have," "having," or the like are intended to be open-ended terms. Features of different embodiments may be combined. The fenders systems of the present invention, although labeled 100, 200, 300, 400, 500, and 600, have been labeled with different numbers only to help identify the figure they are on and not to identify different embodiments (although they may be different embodiments at times). The purpose of this specification is to provide a well out of which to draw and support intended claims-including those as not yet written and/or submitted.

I claim:

1. A fender apparatus comprising:
   a first crossbar having at least one eyelet;
   at least one fender row, with at least one fender, rotationally connected, with at least two degrees of rotational freedom, to the first crossbar; and
   at least one fender whip operably connected to the eyelet with a part of the fender whip, and operably connected to a first object with an additional part of the fender whip.

2. The fender apparatus of claim 1, further comprising at least one fender whip operationally connected to the first eyelet.

3. The fender apparatus of claim 1, further comprising a second crossbar rotationally connected, with at least two degrees of rotational freedom, to the fender row on the opposite side of the fenders from the first crossbar.

4. The fender apparatus of claim 1, wherein there are at least two of the fender rows and each of the fender rows are offset.

5. The fender apparatus of claim 3, wherein the first crossbar and the second crossbar are segmented with hinged crossbar segments.

6. The fender apparatus of claim 3, wherein the first crossbar and the second crossbar are enabled to operationally connect to a load carrier in a manner that allows the fender to support the load carrier without negating the ability of the fender to rotate.

7. The fender apparatus of claim 3, further comprising at least one eyelet operationally connected to the second crossbar.

8. The fender apparatus of claim 7, further comprising a first fender whip attached to an eyelet on the bottom crossbar and a second fender whip attached to a second eyelet on the top crossbar where the first fender whip supports the weight of the fender apparatus, and the second fender whip steadies the fender apparatus so that the fender apparatus sits partially above a cleat.

9. A method of protecting against allision damage comprising;
   A fender apparatus comprising:
      a first crossbar having at least one eyelet; and at least one fender row, with at least one fender, rotationally connected, with at least three degrees of rotational freedom, to the first crossbar;

placing the fender apparatus by operationally connecting at least one fender whip to the eyelet with a part of the fender whip, and operationally connecting a first object with an additional part of the fender whip, between the first object and a second object.

10. The method of protecting against allision damage of claim 9, wherein the first object is a boat and the second object is a dock.

11. The method of protecting against allision damage of claim 9, wherein the second object is a surface; and wherein the placing of the fender apparatus between the first object and the second object is achieved by attaching the fender whip onto the first object and then rolling the first object on the second object over the fender apparatus.

12. The method of protecting against allision damage of claim 9, wherein the placing of the fender apparatus between the boat and the dock is achieved by hanging the fender apparatus by at least two fender whips attached to at least one eyelet and positioned to enable the fender apparatus to operate as a step.

13. The method of protecting against allision damage of claim 9, wherein the placing of the fender apparatus between the boat and the dock is achieved by tying the fender apparatus through both of the eyelets by at least one fender whip to at least one cleat so that the fender apparatus sits with some portion rising over the cleat.

14. The method of protecting against allision damage of claim 9, wherein fender apparatus further comprises the fender whips operationally connected to the eyelets of the first crossbar also operationally connected to a dock piling and the fender row rests between a boat and a dock.

15. The method of protecting against allision damage of claim 9 wherein the fender apparatus further comprises a second crossbar rotationally connected, with at least three degrees of rotational freedom, to the fender row opposite of the first crossbar and at least one eyelet operationally connected to second crossbar.

16. The method of protecting against allision damage of claim 9, wherein the placing of the fender apparatus between the boat and the dock is achieved by use of at least one fender whip operationally connected to the boat and the fender apparatus in a manner that hangs the fender apparatus across the front of the boat so that the fender apparatus prevents damage to the front of the boat.

17. The method of protecting against allision damage of claim 15, wherein the fender apparatus further comprises fender whips operationally connected to the eyelets of the first crossbar are also operationally connected to a second level of a yacht the fender whips operationally connected to o the eyelets of the second crossbar are also operationally connected to the first level of the multi-level yacht.

18. The fender apparatus of claim 1, wherein the first object is a boat.

19. A fender apparatus comprising:
a first crossbar having at least one eyelet;
at least one fender row, with at least one fender, rotationally connected, with at least two degrees of rotational freedom, to the first crossbar;
a lower crossbar rotationally connected, with at least two degrees of rotational freedom, to the fender row on the opposite side of the fenders from the first crossbar;
a lower fender row, rotationally connected, with at least two degrees of rotational freedom, to the lower crossbar and positioned opposite the lower crossbar from the fender row; and
an additional crossbar, rotationally connected, with at least two degrees of rotational freedom, to the lower fender row.

* * * * *